(12) United States Patent
Lee et al.

(10) Patent No.: US 8,815,404 B2
(45) Date of Patent: Aug. 26, 2014

(54) PROTECTIVE FILM AND ENCAPSULATION MATERIAL COMPRISING THE SAME

(75) Inventors: Kwang Hee Lee, Suwon-si (KR);
Xavier Bulliard, Yongin-si (KR); Yi Yeol Lyu, Yongin-si (KR); Hyeon Jin Shin, Suwon-si (KR); Yun Hyuk Choi, Seoul (KR)

(73) Assignees: Samsung Electronics Co., Ltd. (KR);
Cheil Industries Inc. (KR)

( * ) Notice: Subject to any disclaimer, the term of this patent is extended or adjusted under 35 U.S.C. 154(b) by 1067 days.

(21) Appl. No.: 12/241,976

(22) Filed: Sep. 30, 2008

(65) Prior Publication Data

US 2009/0252975 A1 Oct. 8, 2009

(30) Foreign Application Priority Data

Apr. 4, 2008 (KR) ........................ 10-2008-0031873

(51) Int. Cl.
*B32B 9/04* (2006.01)
*B32B 13/04* (2006.01)

(52) U.S. Cl.
USPC ........................................ 428/447; 428/446

(58) Field of Classification Search
USPC .................................................. 428/446, 447
See application file for complete search history.

(56) References Cited

U.S. PATENT DOCUMENTS

| 6,316,112 | B1 | 11/2001 | DuBois et al. | |
| 6,660,822 | B2 * | 12/2003 | Lyu et al. | 528/35 |
| 6,781,148 | B2 * | 8/2004 | Kubota et al. | 257/40 |
| 7,170,087 | B2 | 1/2007 | Kidokoro et al. | |
| 2002/0125822 | A1 | 9/2002 | Graff et al. | |
| 2003/0108749 | A1 | 6/2003 | Ram | |
| 2005/0038220 | A1 * | 2/2005 | Shin et al. | 528/33 |
| 2006/0093959 | A1 | 5/2006 | Huang et al. | |
| 2007/0196966 | A1 | 8/2007 | Iwasawa | |

FOREIGN PATENT DOCUMENTS

| JP | 8-133790 | 5/1996 |
| JP | 2005-57239 | 3/2005 |
| KR | 1020050007126 A | 1/2005 |

* cited by examiner

*Primary Examiner* — Karuna P Reddy
(74) *Attorney, Agent, or Firm* — Cantor Colburn LLP

(57) ABSTRACT

Disclosed herein is a protective film. The protective film is produced by alternate coating of a polysilazane-based polymer and a flexible polysiloxane-based polymer. The polysilazane-based polymer is cured at low temperature to form silica, thereby achieving high hardness and high light transmittance. The protective film has improved interfacial adhesion between the respective coating films, which prevents permeation of moisture and oxygen. In addition, the protective film can be easily produced by low-temperature wet processes. Also disclosed herein is an encapsulation material comprising the protective film.

8 Claims, 4 Drawing Sheets

PROTECTIVE FILM AND ENCAPSULATION MATERIAL COMPRISING THE SAME

CROSS-REFERENCE TO RELATED APPLICATION

This non-provisional application claims priority to Korean Patent Application No. 10-2008-0031873, filed on Apr. 4, 2008, and all the benefits accruing therefrom under U.S.C. §119, the content of which is incorporated herein by reference in its entirety.

BACKGROUND

1. Field

Disclosed herein are a protective film and an encapsulation material comprising the protective film. More specifically, the protective film is produced by coating alternate layers of a polysilazane-based polymer and a flexible polysiloxane-based polymer wherein the polysilazane-based polymer is cured at low temperature to form silica, thereby achieving high hardness and high transmittance. The protective film has improved adhesion at the interface between the respective coating films to prevent permeation of moisture and oxygen through the protective film. In addition, the protective film can be easily produced by low-temperature wet processes.

2. Description of the Related Art

In general, protective films are used to prevent oxygen and moisture from permeating from the outside environment, to assist in maintaining the characteristics of materials contained therein. Such protective films can be used as encapsulation thin films for display devices and as moisture barrier layers for flexible substrates. At present, encapsulation thin films for display devices and moisture barrier layers for flexible substrates are generally produced by depositing inorganic materials to form inorganic layers and intercalating organic or polymer layers between the inorganic layers of the protective film to impart improved crack resistance or flexibility. Deposition of the inorganic materials, however, requires the use of expensive deposition equipment, batch type processes which incur considerable costs, and the intercalation of the polymer layer makes the procedure more complex.

Polysilazanes possess advantages in terms of transparency and antifouling properties. Based on these advantages, polysilazane can be applied to various coating materials for substrates requiring excellent mechanical properties (e.g., surface coating materials for automotive applications and highway soundproofing walls) and outer protective films for electronic devices. However, since polysilazane is cured to form a hydrophilic silica ($SiO_2$) thin film, it has only a limited ability to prevent permeation of moisture.

There is therefore a need to develop protective films that have the ability to prevent permeation of moisture and are flexible.

SUMMARY

Disclosed herein is a protective film comprising one or more pairs of a first coating film and a second coating film wherein the first coating film contains a polysilazane-based polymer and the second coating film contains a polysiloxane-based polymer, and wherein the first and second coating films form alternating layers in the protective film.

The protective film is produced by coating alternate layers of the polysilazane-based polymer and of the polysiloxane-based polymer, where the protective film prevents permeation of moisture and achieves flexibility.

Disclosed herein too is an encapsulation material comprising the protective film.

BRIEF DESCRIPTION OF THE DRAWINGS

The exemplary embodiments will be more clearly understood from the following detailed description taken in conjunction with the accompanying drawings, in which.

DETAILED DESCRIPTION OF THE EMBODIMENTS

Hereinafter, a detailed description will be given of exemplary embodiments with reference to the accompanying drawings.

It will be understood that when an element or layer is referred to as being "on," "interposed," "disposed," or "between" another element or layer, it can be directly on, interposed, disposed, or between the other element or layer or intervening elements or layers may be present.

It will be understood that, although the terms first, second, third, and the like may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, first element, component, region, layer or section discussed below could be termed second element, component, region, layer or section without departing from the teachings of the present invention.

As used herein, the singular forms "a," "an" and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In an embodiment, a protective film comprises one or more pairs of a first coating film and a second coating film wherein the first coating film contains a polysilazane-based polymer and the second coating film contains a polysiloxane-based polymer, and wherein the first and second coating films form alternating layers in the protective film.

Due to this structure of the protective film, the coating films exhibit the individual characteristics of the respective constituent materials, and an additional reaction takes place at the interface between the compositions of the different coating films to provide increased interfacial adhesion and improved prevention of permeation of moisture and oxygen.

Figure 1:
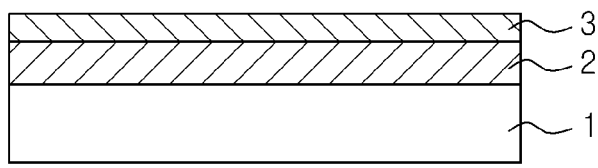
FIG. 1 is a schematic cross-sectional view illustrating an exemplary protective film.

FIG. 1 is an exemplary representative view of the protective film. Referring to FIG. 1, the protective film comprises a substrate 1 and a paired coating of a first coating film 2 containing a polysilazane-based polymer, disposed on a surface of substrate 1, and a second coating film 3 containing a polysiloxane-based polymer disposed on a surface of the first coating film 2 opposite substrate 1.

The polysilazane-based polymer reacts with moisture and reactive oxygen species to be converted to silica at low temperature. This conversion allows the first coating film to prevent permeation of moisture and oxygen from the outside.

The polysilazane-based polymer can be represented by Formula 1:

(1)

wherein $R_1$, $R_2$ and $R_3$, which may be identical or different, are each independently a hydrogen atom, a $C_1$-$C_5$ alkyl group, a $C_2$-$C_5$ alkenyl group or a $C_2$-$C_5$ alkynyl group, and n is a number from 500 to 1,000,000.

In a specific embodiment, the polysiloxane-based polymer can be selected from the group consisting of polymers represented by Formulae 2, 3, 4 and 5:

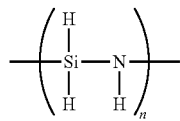

(2)

wherein n is a number from 500 to 1,000,000;

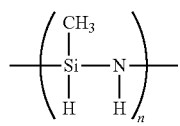

(3)

wherein n is a number from 500 to 1,000,000;

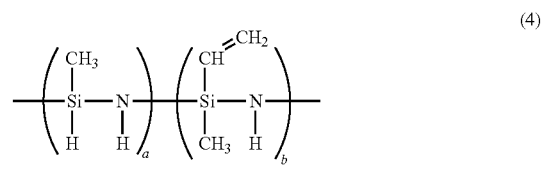

(4)

wherein a and b are each independently a number of 250 to 500,000; and

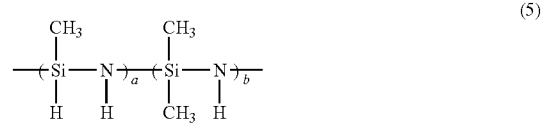

(5)

wherein a and b are each independently a number of 250 to 500,000. It will be appreciated that where numbers of monomeric repeating units are disclosed, such as but not limited to for example n, a, and b in the above Formulae 1 to 5, represent average values and should not be considered as absolute values.

The polysiloxane-based polymer undergoes a series of reactions with moisture and oxygen to form silica. The reactions may occur at a low temperature of about 50 to about 300° C.

The reliability of electronic devices is typically evaluated in the temperature range of about 65 to about 85° C. Plastic substrates have a glass transition temperature ($T_g$) of about 70 to about 200° C depending on their constituent materials. Accordingly, when desired, a particular material can be applied to an encapsulation thin film for an electronic device, the material must be cured at a temperature that does not impair the performance characteristics of the electronic device and the underlying plastic substrate. That is, it is necessary to determine optimum curing conditions of the material relative to the materials of the device being protected. For example, a material for the production of an encapsulation thin film for a substrate is required to have a curing temperature lower than the glass transition temperature of the substrate.

Although the reactions of the polysilazane-based polymer with moisture and oxygen advantageously occur at low temperature, a film formed by curing the polysilazane-based polymer at low temperature is less dense than a film formed by curing the polysilazane-based polymer at high temperature. Further, the surface of the film formed by curing the polysilazane-based polymer at low temperature is hydrophilic. These disadvantages limit the use of the film formed by curing the polysilazane-based polymer only at low temperature as a material for a barrier layer against moisture permeation.

The polysilazane-based polymer and the polysiloxane-based polymer are alternately coated to improve the physical properties of the protective film. Silanol (Si—OH) groups remain unreacted when the polysilazane-based polymer reacts with moisture and reactive oxygen species at low temperatures to be converted to silica. Silanol groups also remain unreacted in the layer containing the polysiloxane-based polymer. As a result, the polycondensation of the silanol groups occurs not only within the two layers but also at the interface between the layers to markedly improve the adhesion between the layers and increase the packing density at the interface.

The protective film is used as a passivation film of an electronic device to improve the insulating properties of the electronic device. Particularly, the polysilazane-based polymer absorbs moisture and oxygen released from the device to be converted to silica, enabling the protective film to perform functions of a getter.

The polysiloxane-based polymer constituting the second coating film 3 is highly transparent and has excellent electrical insulating properties. Based on these advantages, polysiloxane-based polymer is currently used to produce insulating films of electronic devices. $C_2$-$C_{10}$ alkylene groups introduced into the backbone of the polysiloxane-based polymer make the thin film transparent and flexible.

The polysiloxane-based polymer has a cyclic structure in which silicon atoms are bonded to one another through oxygen atoms, and organic groups are present at the ends of the side chains to form hydrolysable groups. The polysiloxane-based polymer can be prepared by hydrolysis and polycondensation of a precursor compound comprising at least one of cyclic siloxane compounds represented by Formula 6:

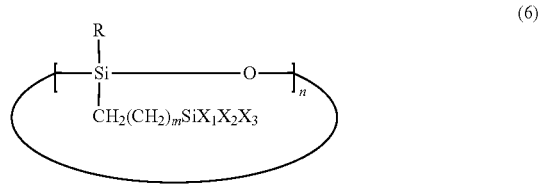

wherein R is a hydrogen atom, a $C_1$-$C_3$ alkyl group, a $C_3$-$C_{10}$ cycloalkyl group or a $C_6$-$C_{15}$ aryl group, $X_1$, $X_2$ and $X_3$ are each independently a $C_1$-$C_3$ alkyl group, a $C_1$-$C_{10}$ alkoxy group or a halogen atom, n is an integer from 3 to 8, and m is an integer from 1 to 10. Hydrolysis and polycondensation of the cyclic siloxane precursor compound is carried out in an organic solvent in the presence of a catalyst and water.

No particular limitation is imposed on the method for the preparation of the cyclic siloxane compounds. For example, the cyclic siloxane compound can be prepared by hydrosilylation of acyclic bifunctional compounds in the presence of a metal catalyst (such as, for example, platinum).

In another, alternative embodiment, the polysiloxane-based polymer can be prepared by hydrolysis and polycondensation of at least one of the monomer silane precursor compounds of Formula 6 and at least one of compounds represented by Formula 7:

wherein R is a hydrogen atom, a $C_1$-$C_3$ alkyl group, a $C_3$-$C_{10}$ cycloalkyl group or a $C_6$-$C_{15}$ aryl group, and $X_1$, $X_2$ and $X_3$ are each independently a $C_1$-$C_3$ alkyl group, a $C_1$-$C_{10}$ alkoxy group or a halogen atom. Hydrolysis and polycondensation of the monomeric silane precursor compound is carried out in an organic solvent in the presence of a catalyst and water.

In a specific embodiment, the polysiloxane-based polymer can be prepared by hydrolysis and polycondensation of cyclic siloxane or monomeric silane precursor compounds to form at least one compound represented by Formula 8:

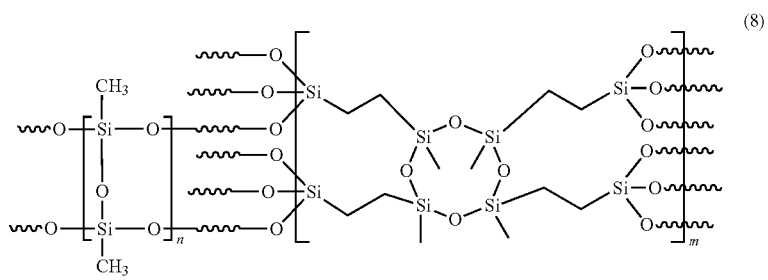

wherein n is an integer from 3 to 8 and m is an integer from 1 to 10. Hydrolysis and polycondensation to form the polysiloxane-based polymer is carried out in an organic solvent in the presence of a catalyst and water.

Examples of catalysts that can be used in the reactions include, but are not limited to, hydrochloric acid, benzenesulfonic acid, toluenesulfonic acid, oxalic acid, formic acid and mixtures thereof. The equivalent ratio of the water used for the hydrolysis and polycondensation to the reactive groups present in the monomers is from 1.0:1 to 100.0:1, specifically from 1.0:1 to 10.0:1. The reaction temperature is from about 0 to about 200° C. and specifically from about 50 to about 110° C. The reaction time is from about 1 to about 100 hours and specifically from about 5 to about 24 hours.

Suitable organic solvents for the preparation of the polysiloxane-based polymer include aromatic solvents, aliphatic solvents, ketone-based solvents, ether-based solvents, silicon-based solvents, and mixtures thereof.

Figure 2:
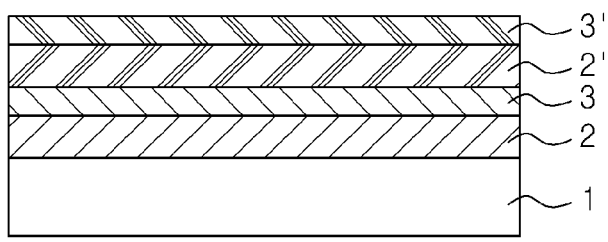
FIG. 2 is an exemplary schematic cross-sectional view illustrating an exemplary protective film.

FIG. 2 is another view of the protective film. As illustrated in FIG. 2, the protective film may comprise two or more pairs of first coating films 2 and 2' each containing the polysilazane-based polymer and second coating films 3 and 3' each containing the polysiloxane-based polymer wherein the polysilazane-based and polysiloxane-based coating films are formed in an alternating pattern on a substrate 1.

The protective film comprising two or more pairs of polysilazane-based and polysiloxane-based coating films (i.e., a four-layer film, six layer film, etc.) is better able to prevent moisture or oxygen permeation than a protective film comprising a single pair of coating films (i.e., a two layer film). However, the protective film comprising two or more pairs of coating films is generally thicker and may therefore not be selected for use in certain applications such as display devices, and in particular flexible display devices, due to the greater thickness and accompanying higher rigidity. The structure (e.g., number of layers) and thickness (e.g., of the individual layers and the total thickness) of the protective film may therefore be varied as appropriate depending on the desired application.

Because of the surface hydrophobicity and hardness of films comprising the polysiloxane-based polymer (relative to the polysilazane-based polymer, films of which have high mechanical strength), the polysiloxane-based polymer is coated to form the outermost layer of the protective film structure comprising two or more pairs of layers so that high hardness, surface hydrophobicity, and other advantages (for example, dust repellency) of the polysiloxane-based coating film can be used most advantageously to protect the underlying substrate.

Thus in an embodiment, the first coating film can be formed using a film-forming composition comprising the polysilazane-based polymer and the second coating film can be formed using a film-forming composition comprising the polysiloxane-based polymer.

In an embodiment, the composition for forming the second coating film may further comprise, as an additive, a multi-functional cyclic siloxane compound represented by Formula 9:

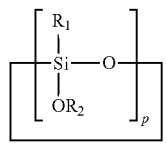

(9)

wherein $R_1$ is a hydrogen atom, a $C_1$-$C_3$ alkyl group or a $C_6$-$C_{15}$ aryl group, $R_2$ is a hydrogen atom, a $C_1$-$C_3$ alkyl group, or a group of formula $SiX_1X_2X_3$ wherein $X_1$, $X_2$ and $X_3$ are each independently a hydrogen atom, a $C_1$-$C_3$ alkyl group, a $C_1$-$C_{10}$ alkoxy group or a halogen atom, with the proviso that at least one of $X_1$, $X_2$ and $X_3$ is a hydrolysable functional group, and p is an integer from 3 to 8.

The additive when included is present in an amount such that the weight ratio of the polysiloxane-based polymer to the additive is 100:1 to 1:1. When the mixture is dissolved in an organic solvent, the solids content of the solution may be adjusted to 0.1 to 80% and specially 5 to 30% by weight, based on the total weight of the solution.

The density of the second coating film can be increased when the additive is combined with the polysiloxane-based polymer as compared to when the polysiloxane-based polymer is used alone. The high density of the second coating film improves the ability of the protective film to prevent permeation of moisture and oxygen. Also, the multi-functional cyclic siloxane compound participates by crosslinking with the polysiloxane-based polymer to increase the packing density of the final siloxane thin film. Inorganic siloxane moieties (Si-O-Si) comprising the crosslinks and formed in part by the presence of the additive increase the interconnectedness of the polysiloxane-based polymers toward one another. However, if the additive is added in an amount larger than the polymer, the concentration of terminal organic groups of the additive, which have crosslinkable reactive functional groups as substituents, may become excessively large, which can lead to a undesired reduction in the degree of crosslinking.

In an embodiment, the multi-functional cyclic siloxane compound of Formula 9 can be selected from the group consisting of the compounds represented by Formulae 10, 11, 12 and 13:

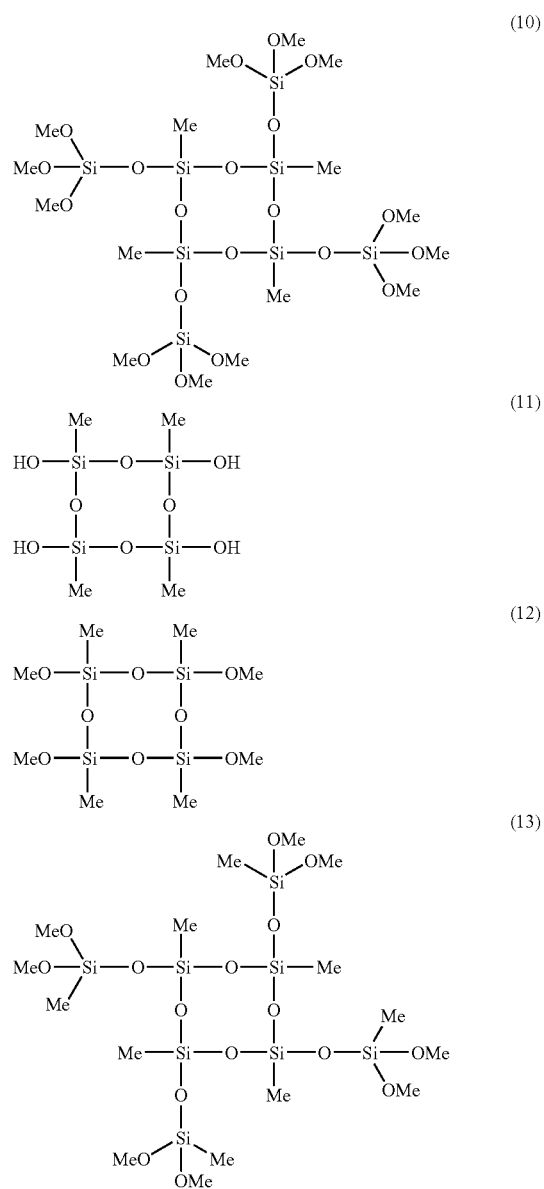

In another embodiment, the composition for forming the second coating film may further comprise, as an additive, a multi-functional cyclic polysiloxane-based polymer prepared by hydrolysis and polycondensation of at least one of the multi-functional cyclic siloxane compounds of Formula 9, in an organic solvent in the presence of a catalyst and water.

The additive may be included in an amount such that the weight ratio of the polysiloxane-based polymer to the additive is 100:1 to 1:1. When the mixture is dissolved in an organic solvent, the solids content of the solution may be adjusted to 0.1 to 80%, specifically 5 to 30% by weight, based on the total weight of the solution. If the multi-functional cyclic polysiloxane-based polymer in an excessively large amount, the second coating film may become less flexible after processing. The multi-functional cyclic polysiloxane-based polymer randomly grows during polymerization, making it impossible to clearly define the structure of the polymer. Without being bound by theory, but while wishing to further explain advantages of the invention, the polymer is believed to have a ladder structure which imparts rigidity, which in turn is believed to provide the excellent mechanical properties of the polymer.

Each of the compositions for the formation of the first and second coating films may also comprise at least one further additive selected from the group consisting of photoacid generators, photobase generators and radical initiators.

Materials capable of generating an acid by irradiation with light can be used as the photoacid generators without limitation, provided these do not significantly adversely affect the performance of the protective layer. Examples of photoacid generators include, but are not limited to, ionic photoacid generators such as onium salt photoacid generators including diphenyliodonium salts of hydroxyl group-containing aromatic sulfonic acids, diazonaphthoquinone ("DNQ") type photoacid generators, non-ionic photoacid generators, such as nitrobenzenesulfonic acids, and polymeric photoacid generators. These photoacid generators may be used alone or as a mixture of two or more thereof.

Examples of suitable photobase generators include, but are not limited to, benzyloxycarbonyl compounds and O-acyloxime compounds. Photobase generators may be used alone or as a mixture of two or more thereof.

As radical initiators, thermal radical initiators may be used. Non-limiting examples of the thermal radical initiators include peroxide initiators, azo initiators and combinations thereof.

The protective film can be produced by any suitable well-known method provided that the polysilazane-based polymer and the polysiloxane-based polymer are coated in alternate layers.

Specifically, in an embodiment, the protective film comprising a monolayer of protective layers can be produced according to the following procedure. First, the polysilazane-based polymer is dissolved in an organic solvent, coated on a surface of a substrate, and thermally cured to form a first coating film. Subsequently, the polysiloxane-based polymer is dissolved in an organic solvent, coated on a surface of the first coating film opposite the substrate, and thermally cured to form a second coating film.

The above procedure can be repeated two or more times to produce the protective film comprising a protective film having a multilayered structure of protective layers.

The substrate may be any substrate commonly used in electronic devices. Any substrate that can be utilized in packaging applications may also be used. Suitable polymeric materials for the substrate include polyethersulfone ("PES"), polycarbonate ("PC"), polyarylate ("PAR"), polyethylene terephthalate ("PET") and polyethylene naphthalate ("PEN"). Blends of polymers may also be used.

Examples of organic solvents capable of dissolving the polysilazane-based polymer and the polysiloxane-based polymer to prepare the respective coating solutions include, but are not particularly limited to: aromatic hydrocarbon solvents, such as anisole and xylene; ketone-based solvents, such as methyl isobutyl ketone and acetone; ether-based solvents, such as tetrahydrofuran, isopropyl ether and dibutyl ether; silicon-containing solvents; and mixtures thereof. The solvent must be used in an amount sufficient to create a concentration at which the polysilazane-based polymer or polysiloxane-based polymer solution can be applied to the substrate. Specifically, when the polysilazane-based polymer or the polysiloxane-based polymer is dissolved in the organic solvent, the solids content of the solution may be 0.1 to 80%, specifically 5 to 30% by weight, based on the total weight of the solution.

Suitable coating processes for applying the coating solution containing the polysilazane-based polymer or the polysiloxane-based polymer to the substrate include drop casting, spin coating, dip coating, spray coating, flow coating and screen printing, but are not limited thereto. In an exemplary embodiment, Spin coating is used. After applying, the coating solution is evaporated to leave the polysilazane-based polymer or polysiloxane-based polymer film on the substrate.

The film is then cured. Curing conditions of the film can be varied but maintained at or below the critical temperature, below which no degradation occurs in the polymeric material and the substrate or a device. A typical electronic device has a critical temperature of about 65 to about 85° C. for reliability and a typical plastic substrate has a glass transition temperature of about 70 to about 200° C. depending on the material thereof. The film is required to be cured at a temperature lower than the lower limits of the critical temperature and the glass transition temperature ranges. This low-temperature curing may be conducted at a temperature lower than the boiling points of the solvent used for the preparation of the coating solution. In this case, it is desirable to cure the film under vacuum. A small amount of a catalyst capable of accelerating the curing may be added to the coating solution, if necessary, provided the concentration of the catalyst is kept low enough that the polymer does not cure while in solution. More specifically, after a photoacid generator, a photobase generator or a radical initiator is added to the coating solution, the resulting solution is applied to the substrate and exposed to UV radiation before or after evaporation to generate an acid or base, or radical reactive group.

The curing conditions may be varied depending on the kind of the polymers. The polysilazane-based polymer reacts with moisture and/or oxygen to be converted to silica. To this end, it is desirable to evaporate the polysilazane-based polymer solution under vacuum at the initial stage to remove as much of the solvent as possible. Also, it is desirable that generated ozone in high humidity air by UV participates in the condensation of the polysilazane-based polymer during curing. On the other hand, since the silanol groups of the polysiloxane-based polymer undergo a condensation reaction at high temperature, it is further desirable to add a photoacid generator to the polysiloxane-based polymer solution to accelerate UV-induced crosslinking.

Thus, in an embodiment, the protective film is produced by wet coating in accordance with the following procedure. First, the polysilazane-based polymer is dissolved in a suitable organic solvent, applied to a substrate, and thermally cured at a temperature of about 50 to about 300° C. for about 30 seconds to about 3 hours to form a first coating film as a crack-free insoluble film. Taking into consideration the critical temperature, the thermal curing is conducted at a temperature of about 50 to about 120° C. under vacuum and thereafter at high humidity for about 5 minutes to about 2 hours. The term "crack-free film" refers to a film that has no cracks when observed under an optical microscope at a magnification of 1,000×. The term "insoluble film" refers to a film that is substantially insoluble in any solvent capable of depositing a siloxane-based resin to form a film or in any solvent described as being useful for the application of a resin.

Then, the polysiloxane-based polymer is dissolved in a suitable organic solvent, applied to a substrate, and thermally cured at a temperature of about 50 to about 300° C. for about 30 seconds to about 3 hours to form a second coating film as a crack-free insoluble film. Taking into consideration the critical temperature, the thermal curing may be conducted at a temperature of about 50 to about 120° C. under vacuum at the initial stage and thereafter at high humidity for about 5 minutes to about 2 hours.

In another embodiment, an encapsulation material comprises the protective film. The encapsulation material has the ability to prevent permeation of oxygen and moisture and is flexible. Therefore, the encapsulation material is suitable for use as an encapsulation thin film for an electronic device, a barrier layer for a substrate, a getter, or an airtight anti-corrosion encapsulation material.

A better understanding of embodiments will be described in more detail with reference to the following examples. However, these examples are given merely for the purpose of illustration and are not to be construed as limiting the scope of the embodiments thereto.

EXAMPLES

Preparation of Polysiloxane-Based Polymer

Preparative Example 1-1

Synthesis of Monomer A-1

29.014 mmol (10.0 g) of 2,4,6,8-tetramethyl-2,4,6,8-tetravinylcyclotetrasiloxane and 0.164g of platinum(0)-1,3-divinyl-1,1,3,3-tetramethyldisiloxane complex (0.1 M solution in xylene, available as Cat. No. 47,951-9 from Aldrich) were put into a flask and diluted with 300 ml of diethyl ether. After cooling down to −78° C., 127.66 mmol (17.29 g) of trichlorosilane was slowly added to the reactor. The temperature of the reactor was gradually raised to room temperature. Thereafter, the mixture was allowed to react at room temperature for 20 hours. The reaction mixture was concentrated under reduced pressure (about 0.1 torr) to remove volatile substances. 10 ml of pentane was added to the concentrate, stirred for one hour, and the solution filtered through celite to obtain a colorless, clear solution. The pentane was removed under reduced pressure (about 0.1 torr) to give the cyclic siloxane compound [—Si(CH$_3$) (CH$_2$CH$_2$SiCl$_3$)O—]$_4$ as a colorless liquid in a yield of 95%.

11.28 mmol (10.0 g) of the cyclic siloxane compound was diluted with 500 ml of tetrahydrofuran and 136.71 mmol (13.83 g) of triethylamine was added thereto. After cooling down to −78° C., 136.71 mmol (4.38 g) of methyl alcohol was slowly added. The temperature was allowed to rise to room temperature. The mixture was allowed to react at room temperature for 15 hours, filtered through celite, and concentrated under reduced pressure (about 0.1 torr) to remove volatile substances. 100 ml of pentane was added to the concentrate, stirred for one hour, and filtered through celite to obtain a colorless, clear solution. The pentane was removed under reduced pressure (about 0.1 torr) to afford Monomer A-1 (yield: 94%) having Formula 14:

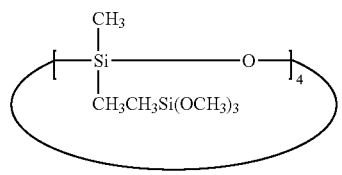

(14)

Preparative Example 1-2

Preparation of Copolymer A-2 of Monomer A-1 and Methyltrimethoxysilane 37.86 mmol (5.158 g) of methyltrimethoxysilane and 3.79 mmol (3.162 g) of Monomer A-1 were put into a flask and diluted with 100 ml of tetrahydrofuran. Water and concentrated hydrochloric acid (35 wt % aqueous) were mixed in a volume ratio of 100:0.12 at −78° C. until the hydrochloric acid concentration became 0.0159 mmol. The aqueous hydrochloric acid solution was slowly added to the tetrahydrofuran solution, and then water was slowly added thereto until the total amount of the water was 529.67 mmol (9.534 g). Thereafter, the mixture was allowed to react while slowly warming to 70° C. The reaction was continued for 16 hours. After the reaction solution was transferred to a separatory funnel, 100 ml of diethyl ether was added to the separatory funnel. The solution was washed with water (100 ml×5). 5 g of anhydrous sodium sulfate was added to the separatory funnel, stirred at room temperature for 10 hours to remove the remaining water, and filtered to give a colorless, clear liquid. The filtrate was concentrated under reduced pressure (0.1 torr) to remove volatile substances, affording 5.5 g of Polymer A-2 as a white powder.

Preparative Example 1-3

Fractionation of Copolymer A-2 of Monomer A-1 and Methyltrimethoxysilane 5 g of Copolymer A-2 of Monomer A-1 and methyltrimethoxysilane, which was prepared in Preparative Example 1-2, was dissolved in 7 ml of acetone in a flask. The solution was passed through a syringe filter (pore size: 0.2 μm) to remove fine powder and other impurities. To the supernatant of the filtrate was slowly added 20 ml of water to obtain a precipitate as a white powder. The precipitate was collected from the acetone/water solution and dried under reduced pressure (0.1 torr) at 0-5° C., affording 3.5 g of a fractionated polymer (A-3).

Preparation of Multi-Functional Cyclic Siloxane Compound (Additive)

Preparative Example 2-1

Synthesis of Monomer B-1

41.6 mmol (10.00 g) of 2,4,6,8-tetramethyl-2,4,6,8-cyclotetrasiloxane was diluted with 100 ml of tetrahydrofuran in a flask and 700 mg of 10 wt % palladium/charcoal (Pd/C) was added thereto. To the mixture was added 177.8 mmol (3.20 ml) while removing hydrogen gas produced during the addition. The resulting mixture was allowed to react at room temperature for 5 hours. The reaction mixture was filtered through celite and MgSO$_4$. The filtrate was concentrated under reduced pressure (about 0.1 torr) to remove volatile substances, affording Monomer B-1 as a colorless liquid, represented by Formula 11:

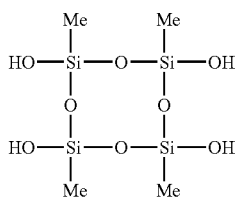

(11)

$^1$H-NMR (300 MHz) (acetone-$d_6$) data for the monomer are as follows: δ 0.067 (s, 12H, 4 x [—CH$_3$]), 5.52 (s, 4H, 4 x [—OH]).

Preparative Example 2-2

Synthesis of Monomer B-2

41.6 mmol (12.6 g) of Monomer B-1 prepared in Preparative Example 2-1 was diluted with 200 ml of tetrahydrofuran (THF) and 177.8 mmol (13.83 g) of triethylamine was added thereto. After cooling down to 0° C., 177.8 mmol (25.0 g) of chlorotrimethoxysilane was slowly added. The mixture was allowed to react while slowly warming to room temperature. The reaction was continued for 12 hours. The reaction solution was filtered through celite. The filtrate was concentrated under reduced pressure (about 0.1 torr) to remove volatile substances, affording Monomer B-2 as a colorless liquid, represented by Formula 10:

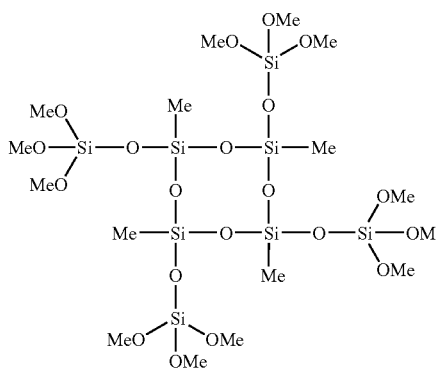

(10)

$^1$H-NMR (300 MHz) data for the monomer are as follows: δ 0.092 (s, 12H, 4 x [—CH$_3$]), 3.58 (s, 36H, 4 x [—OCH$_3$]$_3$)

Production of Protective Films

Example 1

A solution of 0.5 g of a polysilazane-based polymer (AZ SPINFIL™ 65001, AZEM) in dibutyl ether was applied to a 200 μm thick polyethersulfone (PES) substrate (i-component) by drop casting. Subsequently, the film was pre-baked on a hot plate at 50° C. for 5 minutes and irradiated with UV using a Hg—Xe lamp for 10 minutes. The resulting film was kept in a temperature-controlled vacuum oven at 80° C. for about 5 minutes and baked in a chamber filled with water vapor at 80° C. for at least 2 hours to form a first coating film.

Then, 1.16 g of the polysiloxane-based polymer (A-3) prepared in Preparative Example 1-3 was dissolved in 3.87 g of propylene glycol methyl ether acetate (PGMEA) and sufficiently stirred to prepare a second coating solution having a solids content of 23 wt % with respect to the total weight of the solution. The second coating solution was spin-coated at 1,500 rpm on the first coating film for 30 seconds. The resulting structure was pre-baked on a hot plate at 50° C. for 5 minutes, irradiated with UV using a Hg—Xe lamp for 10 minutes, and post-baked in a vacuum oven at 80° C. for 2 hours to form a second coating film, completing the production of a protective film.

Example 2

A protective film was produced in the same manner as in Example 1 except that 0.387g of the multi-functional siloxane compound (B-2) prepared in Preparative Example 2-2 was added as an additive to 0.774 g of the polysiloxane-based polymer (A-3) prepared in Preparative Example 1-3 to prepare a second coating solution having a solids content of 23 wt % with respect to the total weight of the solution.

Example 3

A protective film was prepared in the same manner as in Example 2 except that a 100 μm thick PEN substrate (TEONEX®, DuPont-Teijin, Japan) was used.

[Characterization of Protective Films]

Figure 4:
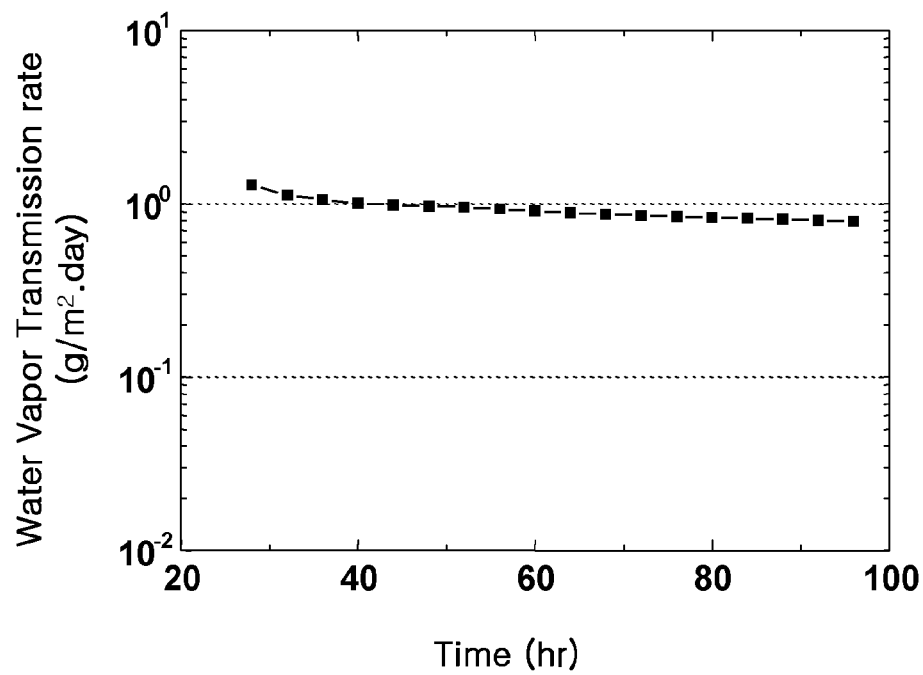
FIG. 4 is a graph showing the variation in the water vapor transmission rate of an exemplary protective film produced in Example 2 over time.
Figure 5:
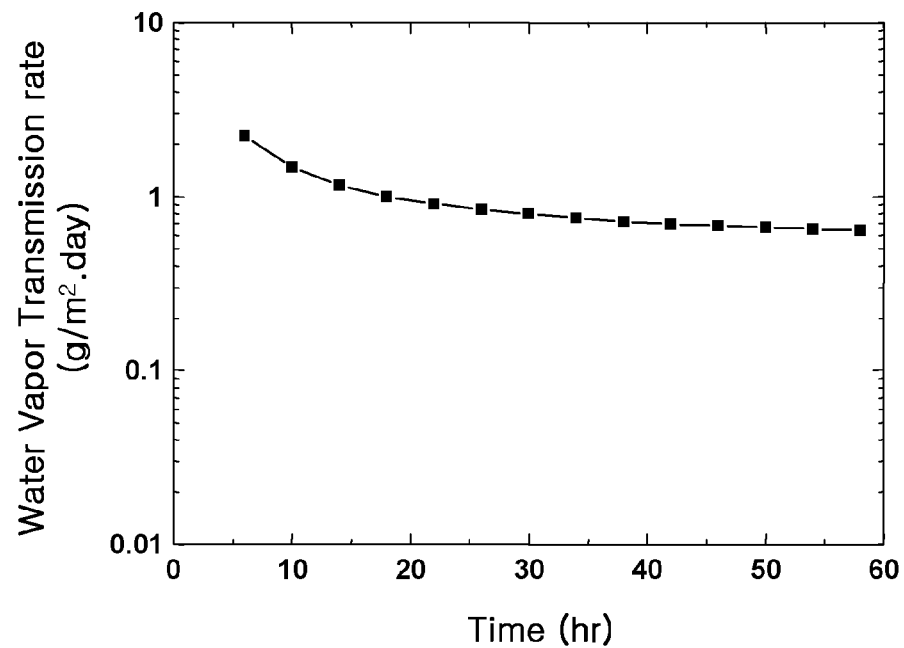
FIG. 5 is a graph showing the variation in the water vapor transmission rate of an exemplary protective film produced in Example 3 over time.

A water vapor permeation test instrument (AQUATRAN® modell, MOCON, USA) was used to measure the water vapor transmission rate of the protective films produced in Examples 1, 2 and 3. The respective results are shown in FIGS. 3, 4 and 5.

Figure 3:
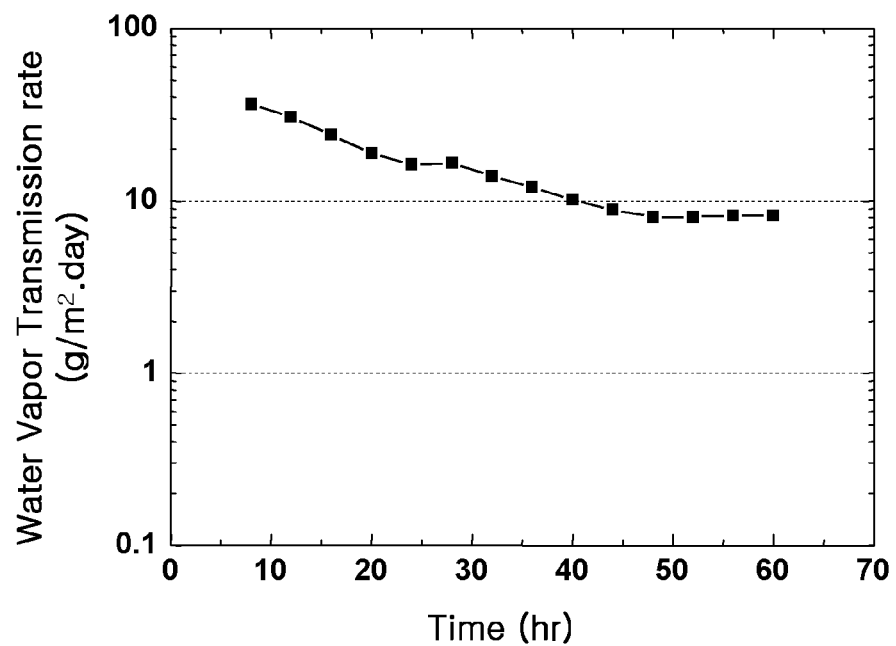
FIG. 3 is a graph showing the variation in the water vapor transmission rate of an exemplary protective film produced in Example 1 over time.

The graph of FIG. 3 shows that the initial water vapor transmission rate of the protective film produced in Example 1 was about 36 g/m$^2$·day and decreased to about 8.2 g/m$^2$·day. The reason for this decrease is estimated to be because moisture present on the surface and inside of the film was detected at the initial stage. The values stabilized about 45 hours after the testing.

The protective film of Example 2 was produced using the multi-functional siloxane compound as an additive to achieve increased density. As can be seen from the graph of FIG. 4, the protective film had a water vapor transmission rate of 0.8 g/m$^2$·day, indicating that the ability of the protective film to prevent permeation of moisture was improved by at least sixty times that of the substrate, taking into consideration the water vapor transmission rate (50 g/m$^2$·day) of the substrate.

The protective film using the PEN substrate was measured for water vapor transmission rate in Example 3 to identify whether the improved result was attained in the protective film irrespective of the kind of the substrates used. The graph of FIG. 5 shows that the water vapor transmission rate of the protective film was about 0.6 g/m$^2$·day, indicating that the kind of the substrates did not affect the functions of the protective films.

Figure 6:
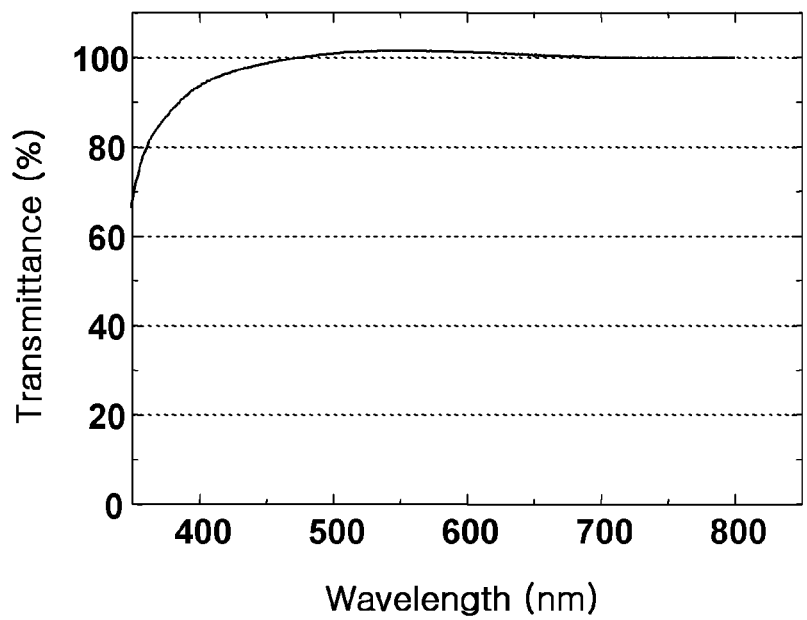
FIG. 6 is a graph showing the variation in the transmittance of an exemplary protective film produced in Example 1 in the visible region.
Figure 7:
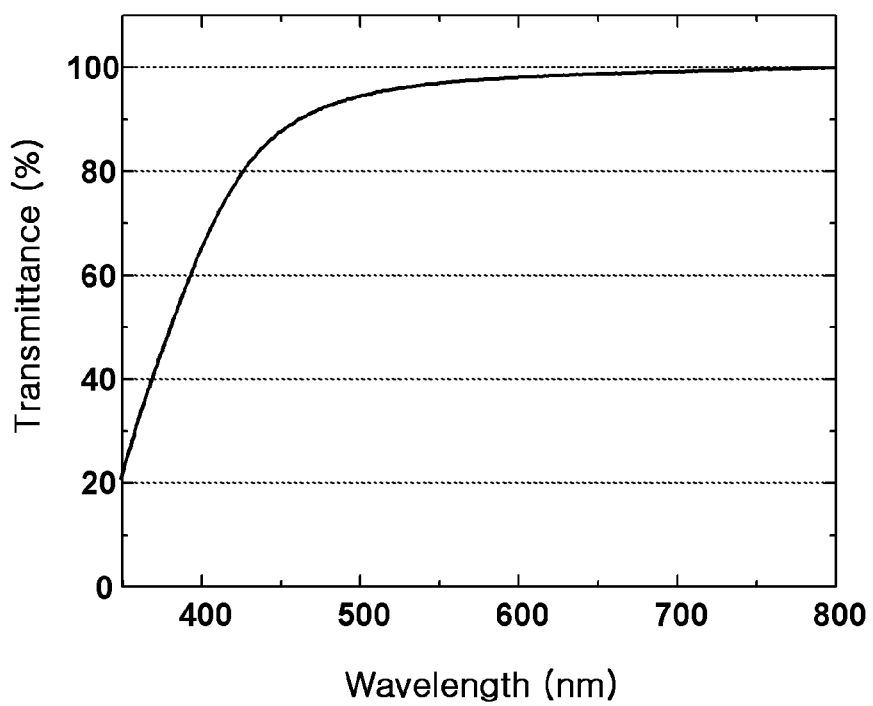
FIG. 7 is a graph showing the variation in the transmittance of an exemplary protective film produced in Example 2 in the visible region.
Figure 8:
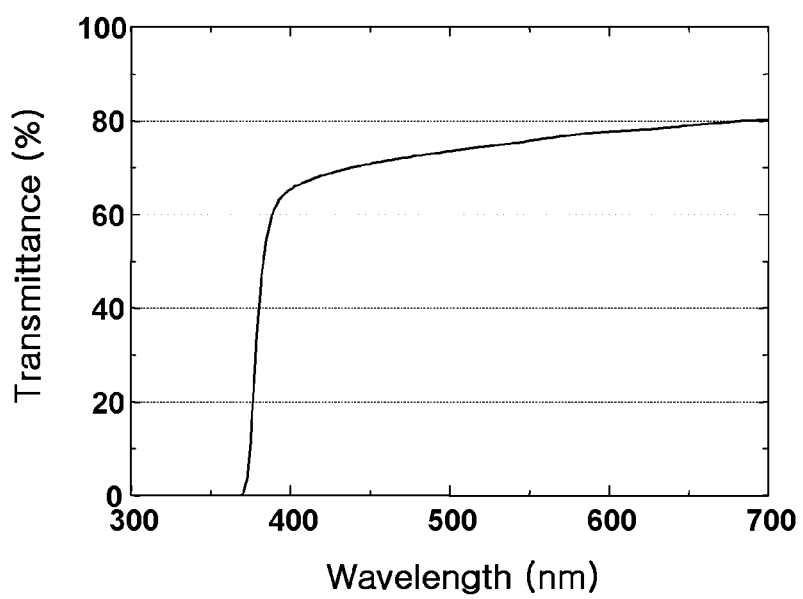
FIG. 8 is a graph showing the variation in the transmittance of an exemplary protective film produced in Example 3 in the visible region.

The transmittance of the protective films produced in Examples 1, 2 and 3 was measured using a UV/Vis/NIR spectrometer (CARY 5000, Varian Inc., USA). The respective results are shown in FIGS. 6, 7 and 8. A protective film having a transmittance of at least 80% in the visible range of 400-800 nm is suitable for a substrate of a display device.

Referring to FIGS. 6, 7 and 8, each of the protective films (Examples 1 and 2) produced on the PES substrates had a transmittance of 80% or higher over almost the entire wavelength region, demonstrating that they can be applied to barrier layers for substrates of display devices.

The protective film (Example 3) produced on the PEN substrate had a transmittance of 60-80% over almost the entire wavelength region, demonstrating that it can be applied to other substrates.

Although exemplary embodiments have been described herein with reference to the foregoing embodiments, those skilled in the art will appreciate that various modifications and variations are possible without departing from the spirit of the invention as disclosed in the accompanying claims. Therefore, it is to be understood that such modifications and variations are encompassed within the scope of the invention.

What is claimed is:

1. A protective film comprising one or more pairs of a first coating film and a second coating film, wherein the first coating film contains a polysilazane-based polymer and the second coating film contains a polysiloxane-based polymer comprising a $C_2$ to $C_{10}$ alkylene group in a backbone thereof, wherein the first and second coating films form alternating layers in the protective film, wherein the polysilazane-based polymer is represented by Formula 1:

  (1)

wherein n is a number from 500 to 1,000,000, wherein the polysiloxane-based polymer is prepared by hydrolysis and polycondensation of at least one compound represented by Formula 6:

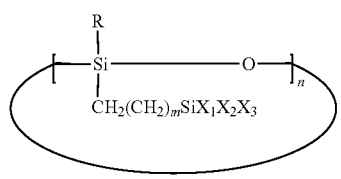  (6)

wherein R is $C_1$-$C_3$ alkyl group, $X_1$, $X_2$ and $X_3$ are each independently a $C_1$-$C_{10}$ alkoxy group, n is an integer from 3 to 8 and m is an integer from 1 to 10, and at least one compound represented by Formula 7:

  (7)

wherein R is $C_1$-$C_3$ alkyl group, and $X_1$, $X_2$ and $X_3$ are each independently a $C_1$-$C_{10}$ alkoxy group, and wherein the second coating film further comprises a multi-functional cyclic siloxane compound represented by Formulas 10 or 13,

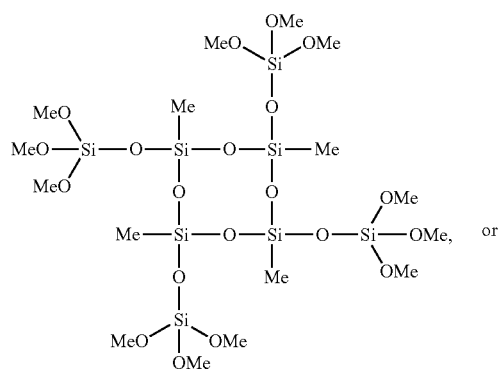  (10)

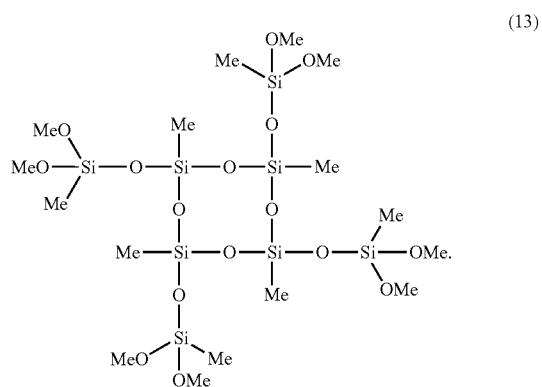  (13)

2. The protective film of claim 1, wherein the polysiloxane-based polymer is prepared by hydrolysis and polycondensation of at least one compound represented by Formula 6:

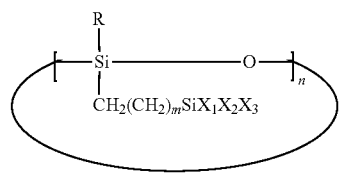  (6)

wherein R is $C_1$-$C_3$ alkyl group, $X_1$, $X_2$ and $X_3$ are each a $C_1$-$C_{10}$ alkoxy group, and at least one compound represented by Formula 7:

  (7)

wherein R is $C_1$-$C_3$ alkyl group, and $X_1$, $X_2$ and $X_3$ are each a $C_1$-$C_{10}$ alkoxy group, and wherein hydrolysis and polycondensation are carried out in an organic solvent in the presence of a catalyst and water.

3. The protective film of claim 1, wherein the polysiloxane-based polymer is prepared by hydrolysis and polycondensation to provide at least one compound represented by Formula 8:

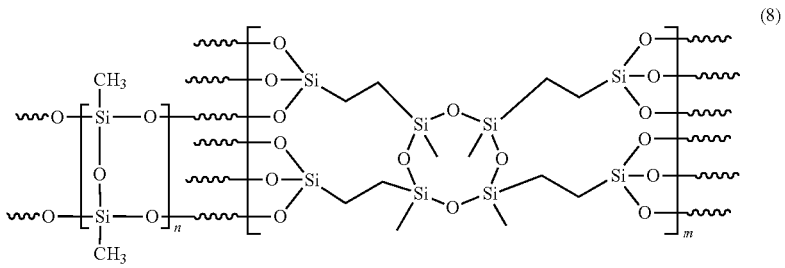
(8)

wherein n is an integer from 3 to 8 and m is an integer from 1 to 10, and wherein hydrolysis and polycondensation are carried out in an organic solvent in the presence of a catalyst and water.

4. The protective film of claim 1, wherein the multi-functional cyclic siloxane compound is represented by Formula 13:

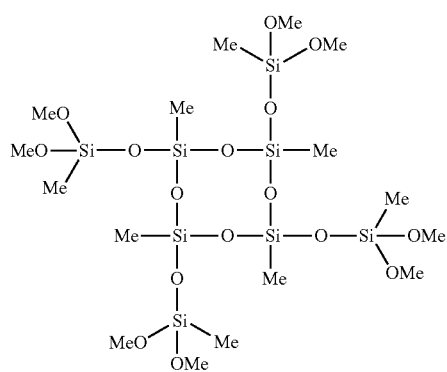
(13)

5. The protective film of claim 1, wherein each of the film-forming compositions further comprises at least one additive selected from the group consisting of photoacid generators, photobase generators, and radical initiators.

6. An encapsulation material comprising the protective film of claim 1.

7. The encapsulation material of claim 6, wherein the encapsulation material is used as a direct thin film encapsulation for an electronic device, a barrier layer for a substrate, a getter or an airtight anti-corrosion encapsulation material.

8. The protective film of claim 1, wherein the multi-functional cyclic siloxane compound is a compound represented by Formula 10:

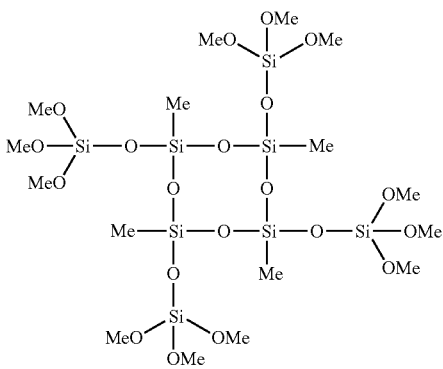
(10)

* * * * *